(12) United States Patent
Llinas et al.

(10) Patent No.: US 7,870,086 B2
(45) Date of Patent: Jan. 11, 2011

(54) METHOD AND APPARATUS FOR PHASE-INDEPENDENT PREDICTABLE RESETTING

(75) Inventors: Rodolfo R. Llinas, New York, NY (US); Viktor B. Kazantsev, Nizhny (RU); Vladimir I. Nekorkin, Nizhny (RU); Vladimir I. Makarenko, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 11/122,763

(22) Filed: May 4, 2005

(65) Prior Publication Data

US 2005/0280446 A1    Dec. 22, 2005

Related U.S. Application Data

(63) Continuation-in-part of application No. 10/627,355, filed on Jul. 24, 2003, now Pat. No. 7,822,694.

(60) Provisional application No. 60/568,877, filed on May 5, 2004, provisional application No. 60/405,191, filed on Aug. 21, 2002.

(51) Int. Cl.
G06F 15/00 (2006.01)
G06F 15/18 (2006.01)

(52) U.S. Cl. .................................................. 706/62

(58) Field of Classification Search ................ 706/23, 706/35, 33, 20, 15, 25, 14, 62; 327/3; 435/252.3
See application file for complete search history.

(56) References Cited

U.S. PATENT DOCUMENTS 4,759,368 A * 7/1988 Spanton et al. ............... 607/46
4,879,528 A * 11/1989 Gotanda ......................... 331/4
5,766,137 A * 6/1998 Omata ......................... 600/587
6,181,754 B1 * 1/2001 Chen ............................ 375/350

(Continued)

OTHER PUBLICATIONS

'Modeling inferior olive neuron dynamics': Velarde, Nekorkin, Zazantsev, Makarenko, Llinas, Jan. 2002, Elsevier, 0893-6080(01)00130-7, pp. 5-10.*

(Continued)

*Primary Examiner*—Michael B. Holmes
*Assistant Examiner*—Peter Coughlan
(74) *Attorney, Agent, or Firm*—Foley & Lardner LLP

(57) ABSTRACT

The oscillatory dynamics of inferior olive (IO) neurons found in the olivo-cerebellar network of the brain are reproduced and applied to various control applications. An IO neuron model is provided which produces quasi-sinusoidal oscillations with a characteristic amplitude and frequency. Action potentials occur at the peaks of the oscillations and have precise timing properties. Stimuli applied to the IO neuron model show no changes in oscillation amplitude and frequency but do produce a shift of the oscillation phase, and hence a time shift of the corresponding action potentials. The resulting phase is defined by the strength of the stimulus and does not depend on when the stimulus is applied, thus providing a self-referential phase reset (SPR) effect. The oscillations of multiple IO neurons, or their models, coupled together tend to become organized in space and time in the form of oscillatory phase clusters. The phases of the IO oscillators can be quickly set to a desired phase pattern irrespective of the history of phase evolution. A circuit for implementing the IO neuron model and a control system based on the circuit are described.

35 Claims, 13 Drawing Sheets

U.S. PATENT DOCUMENTS

2004/0075473 A1    4/2004    Llinas et al.

OTHER PUBLICATIONS

'Electrotonically Mediated Oscillatory Patterns in Neuronal Ensembles: An In Vitri Voltage Dependent Dye-Imaging Study in the inferior Olive': Leznik, Makarenko, Llinas, Apr. 2002, The journal of Neurosciences, pp. 2084-2815.*
'Pulsed Neural Networks':Maass, 1999, MIT Press, pp. 214, 298-301.*
'Cerebellar adaptive control of a biomimetic manipulator': Spoelstra, Elservier Science, 1999, 0925-2312, 881-889.*
'A functional model of the olivocerebellar system that produces rhythmic activity at gamme frequency': Kuntalp, 2001, IEEE, 0-7803-7211, 802-805.*
'Chaotic Noise to Control Lattices of Inferior Olive Neurons': Frasca, 2001, Programme des Journees Doctorales d'Automatique.*
Schweighofer et al., 'Electrophysiological Properties of Inferior Olive Neurons: A Compartmental Model' 1999, The American Physiological Society, pp. 804-817.*
Leznik, E., et al., "Electrotonically Mediated Oscillatory Patterns in Neuronal Ensembles: An In Vitro Voltage-Dependent Dye-Imaging Study in the Inferior Olive," The Journal of Neuroscience, Apr. 1, 2002, 22(7), pp. 2804-2815.
Llinas, R.R., "The Noncontinuous Nature of Movement Execution," Motor Control: Concepts and Issues, edited by D. R. Humphrey and H.-J. Freund; (Wiley, New York), 1991, pp. 223-242.
Lang, Eric J., et al., "Patterns of Spontaneous Purkinje Cell Complex Spike Activity in the Awake Rat," The Journal of Neuroscience, Apr. 1, 1999, 19(7), pp. 2728-2739.
Welsh, John P., et al., "The Cerebellum: From Structure to Control—Some organizing principles for the control of movement based on olivocerebeller physiology," Progress in Brain Research, vol. 114, 1997, pp. 449-461.
Lang, E.J., et al., "GABAergic Modulation of Complex Spike Activity by the Cerebellar Nucleoolivary Pathway in Rat," Journal of Neurophysiology, vol. 76, No. 1, Jul. 1996, pp. 255-275.
Welsh, John, et al., "Dynamic organization of motor control within the olivocerebellar system," Nature, vol. 374, Mar. 30, 1995, pp. 453-457.
Sugihara, I., et al.,"Uniform Olivocerebellar Conduction Time Underlies Purkinje Cell Complex Spike Synchronicity in the Rat Cerebellum," Journal of Physiology (1993), 470, pp. 243-271.
Sasaki, K., et al., "Multiple Purkinje Cell Recording in Rodent Cerebellar Cortex," European Journal of Neuroscience, vol. 1, 1989, pp. 572-586.
Llinas, R., et al., "The Functional Organization of the Olivo-Cerebellar System as Examined by Multiple Purkinje Cell Recordings," European Journal of Neuroscience, vol. 1, 1989, pp. 587-602.
Llinas, R., "The Intrinsic Electrophysiological Properties of Mammalian Neurons: Insights into Central Nervous System Function," Science, vol. 242, pp. 1654-1664 (1998).
Llinas, R., et al., "Electrohysiology of Mammalian Inferior Olivary Neurones In Vitro. Different Types of Voltage-Dependent Ionic Conductances," Journal of Physiology (London), 315, 1980, p. 549-567.
Llinas, R. et al., "Electrotonic Coupling Between Neurons in Cat Inferior Olive," Journal of Neurophysiology, vol. XXXVII, No. 3, 1974, pp. 560-571.
Sotelo, C., et al., "Structural Study of Inferior Olivary Nucleus of the Cat: Morphological Correlates of Electronic Coupling," Journal of Neurophysiology, vol. XXXVII, No. 3, 1974, pp. 541-559.
Eccles, J.C., et al., "The Excitatory Synaptic Action of Climbing Fibres on the Purkinje Cells of the Cerebellum," Journal of Physiology, (London), 182, 1965, pp. 268-296.
Han, Y., et al., "A Neural Cell Model of MSO," IEEE 1991 Proc. 17th annual Bioengineering Conf., Apr. 1991, pp. 121-122.
Maass, W., et al., "On the Complexity of Learning for A Spiking Neuron," ACM 10th annual conf. Computational Learning Theory, 1997, pp. 54-61.
Llinas, R., I of the Vortex: From Neurons to Self, The MIT Press, 2001, pp. 44-51; 120-123.
Ito, M., Cerebellum and Neural Control, Raven Press, New York, 1984, pp. 44, 47, 97, 99, 158, 170-172, 174-176, 274-276, 432-435.
Kazantsev, V.B., et al., "Olivo-cerebellar Cluster-Based Universal Control System," Procs. Natl. Acad. Sci. USA 100 (32), 2003, p. 13064-13068.
Bal, T. & McCormick, D. A., "Synchronized Oscillations in the Inferior Olive Are Controlled by the Hyperpolarization-Activated Cation Current lh," J. Neurophysiol. 77, 1997, p. 3145-3156.
Lampl, I. & Yarom, Y., "Subthreshold Oscillations of the Membrane Potential: A Functional Synchronizing and Timing Device," J. Neurophysiol., 70, 1993, p. 2181-2186.
Pikovsky, A., et al., Synchronization. A Universal Concept in Nonlinear Sciences, Cambridge University Press, United Kingdom, 2001, pp. 98-136.
Yamasaki, T., et al., "Phase Reset and Dynamic Stability During Human Gait," Biosystems, 2003, vol. 71, p. 221-232.
Hopfield, J.J., "Neural Networks and Physical Systems with Emergent Collective Computational Abilities," Proc. Natl. Acad. Sci. USA, vol. 79, 1982, p. 2554-2558.
Abbott, L.F., "A Network of Oscillators," J. Phys. A: Math. Gen., vol. 23, 1990, p. 3835-3859.
Velarde, M.G., "Modeling Inferior Olive Neuron Dynamics," Neural Networks, vol. 15, 2002, p. 5-10.
Makarenko, Vladimir, et al., "Experimentally determined chaotic phase synchronization in a neuronal system," Proc. Natl. Acad. Sci. USA, Dec. 22, 1998, vol. 95, pp. 15747-15752.
Makarenko, Vladimir, et al, "A New Approach to the Analysis of Multidimensional Neuronal Activity: Markov Random Fields," Neural Networks, Jul. 1997, vol. 10, No. 5, pp. 785-789.
Llinas, R., et al., "Oscillatory Properties of Guinea-Pig Inferior Olivary Neurones and Their Pharmacological Modulation: An In Vitro Study," Journal of Physiology (London), Jul. 1986, 376, pp. 163-182.
Llinas, R., et al., "Depolarization-Release Coupling Systems in Neurons," Neurosciences Research Program Bulletin, Dec. 1977, vol. 15, No. 4, pp. 555-687.
Sedra et al., "Microelectronic Circuits", Jan. 8, 1998, pp. 668-669, 714-716 and 973-1039, Oxford University Press, Inc., New York, NY, USA.

* cited by examiner

METHOD AND APPARATUS FOR PHASE-INDEPENDENT PREDICTABLE RESETTING

RELATED PATENT APPLICATIONS

The present application claims priority from the following patent applications which are incorporated herein by reference in their entireties: this application claims priority under 35 U.S.C. §119(e) of U.S. Provisional Patent Application Ser. No. 60/568,877, filed May 5, 2004, entitled METHOD AND APPARATUS FOR PHASE-INDEPENDENT PREDICTABLE RESETTING and is a continuation-in-part of U.S. patent application Ser. No. 10/627,355, filed Jul. 24, 2003, entitled NEURO-MIMETIC CONTROL SYSTEMS AND METHODS which claims priority under 35 U.S.C. §119(e) of U.S. Provisional Patent Application Ser. No. 60/405,191, filed Aug. 21, 2002, entitled NEURO-MIMETIC CONTROL SYSTEMS AND METHODS.

FIELD OF THE INVENTION

The present invention relates to control systems and methods, and particularly to control systems and methods that exhibit phase-independent predictable resetting.

BACKGROUND INFORMATION

The olivo-cerebellar network is the key neuronal circuit in the brain for providing higher-level motor control in vertebrates. The network is based on oscillatory dynamics of inferior olive (IO) neurons controlled by an inhibitory feedback loop with the cerebellar cortex. The oscillations of IO neurons are organized in space and time in the form of oscillatory phase clusters. The clusters provide a dynamical representation of arbitrary motor intention patterns that are further mapped to the motor execution system. Being supplied with sensory inputs, the olivo-cerebellar network is capable of rearranging the clusters in the process of movement execution.

The IO neurons produce quasi-sinusoidal oscillations with definite amplitude and frequency. Action potentials occur at the peaks of the oscillations and, hence, have precise timing properties. The application of extracellular stimuli to the IO neurons does not cause changes in oscillation amplitude and frequency. Stimulation produces only a shift of the oscillation phase and hence a time shift of the corresponding action potential. Moreover, the resulting phase depends only on the strength of the stimulus and does not depend on the point at which the stimulus is applied. This effect is referred to self-referential phase reset (SPR) which has been experimentally observed in intracellular recordings. Accordingly, the phase of the IO oscillators can be quickly reset to a desired phase regardless of the history of phase evolution.

Motor control requires highly coordinated signals driving a large number of muscles. recent studies have shown that motor intention patterns to start an arbitrary movement are formed in the olivo-cerebellar functional network. See, Llinás, R. (1991) in Motor Control: Concepts and Issues, eds. Humphrey, D. R. & Freund, H. J. (Wiley, New York), pp. 223-242; Llinás, R. (2001) I of the Vortex: From neurons to self, The MIT Press; Welsh, J. P. & Llinás R (1997) Prog. Brain Res. 114, 449-461; Ito M. (1984) Cerebellum and Neural Control, Raven Press, New York.

The motor intention patterns represent a set of action potentials inter-coordinated in space and time innervating a corresponding set of motor neurons. To provide the required synchrony of muscle activation, the action potentials must maintain their correct inter-relationships even when traveling to spatially distant muscle areas. The main information characteristic, i.e. the main information-bearing control parameter, is the mutual phase relationship between sequences of action potentials innervating different muscles. The coordination mechanism is provided by the sequence of oscillatory events in the olivo-cerebellar system.

The implementation of a universal control system (UCS) capable of intelligent multi-parameter control based on olivo-cerebellar physiology has been recently proposed. See Kazantsev, V. B., Nekorkin V. I., Makarenko, V. I. & Llinás, R. (2003) Procs. Natl. Acad. Sci. USA 100 (32), 13064-13068.

Inferior olive (IO) neurons, which oscillate at approximately 10 Hz, generate a set of action potentials at the peaks of subthreshold oscillations. See Llinás, R. & Yarom, Y. (1986) J. Physiol. 376, 163-182; Bal, T. & McCormick, D. A. (1997). J Neurophysiol. 77, 3145-3156; Lampl, I. & Yarom, Y. (1993) J Neurophysiol. 70, 2181-2186.

Mutual oscillation phase shifts uniquely define the time shift between the action potentials. Thus, motor intention patterns are formed as the oscillatory phase clusters in the inferior olive. See Kazantsev, V. B., Nekorkin V. I., Makarenko, V. I. & Llinás, R. (2003) Procs. Natl. Acad. Sci. USA 100 (32), 13064-13068; Leznik, E., Makarenko, V. & Llinás, R. (2002) J. Neurosci. 22, 2804-2815. Through olivo-cerebellar inhibitory feedback and sensory inputs, the IO neurons are capable of appropriately reconfiguring their oscillations so as to provide the required phase cluster pattern.

To sustain a given phase cluster, the IO neurons have an internal synchronization mechanism. The dendrite of an IO neuron forms gap junctions with about 50 neighboring cells providing local oscillation synchrony. See Llinás, R. & Yarom, Y. (1981) J. Physiol. Lond. 315, 549-567; Sotelo, C., Llinás, R., & Baker, R. (1974) J. Neurophysiol. 37, 560-571. Such local coupling cannot provide global coherence and the transition from one cluster configuration to another at sufficiently fast time scales. The reset of the IO oscillators' phases occurs due to sensory input signals coming as the effectors' feedback. Accordingly, the inferior olive neurons reconfigure their phases of oscillation, automatically evolving to an optimal cluster configuration.

The analysis of intracellular recordings from IO neurons under in vitro conditions has shown that the phase reset behavior of oscillating IO neurons has an interesting property. In contrast to typical oscillatory systems, the reset phase of an IO neuron is defined only by the characteristics of the resetting stimulus and does not depend on the moment of time (i.e., initial phase) at which the stimulus is applied. See Leznik, E., Makarenko, V. & Llinás, R. (2002) J. Neurosci. 22, 2804-2815. In this sense, the reset is self-referential in that it ignores the "history" of the system evolution. This is a key property which makes the IO neuron oscillators extraordinarily flexible for processing motor commands and adapting to current conditions. Moreover, different IO neuron oscillators even when uncoupled and remotely located from each other can be quickly synchronized in phase upon receiving the same stimulus.

FIGS. 1A-1D show intracellular recordings of spontaneous IO neuron oscillations at 2 Hz interrupted by extracellular stimuli. In accordance with previous results (see Llinás and Yarom, 1986), an extracellular stimulus delivered at the dorsal border of the IO nucleus generated a full action potential followed by a membrane hyperpolarization in nearby neurons. As shown in FIG. 1A, after extracellular stimulation (marked with an arrowhead), the oscillations disappeared for about 750 msec (boxed area 10) and then resumed with a different phase approximately. The membrane potential was approximately 60 mV.

In FIG. 1B, intracellular recordings of spontaneous (dashed black trace) and stimulus-evoked (solid black trace) oscillations from the same cell are superimposed. Their corresponding power spectra are shown below. Note that extracellular stimulation only modified the phase of the spontaneous IO oscillations without affecting their amplitude and frequency.

This electrical behavior could be obtained repeatedly for any given IO cell. In FIG. 1C, six individual intracellular traces of stimulus-evoked oscillations from the same cell are superimposed on the left. Each trace is shown in a different color. Their corresponding power spectra are displayed below. In every recording, the frequency of stimulation-evoked oscillation was the same (2.0 Hz). Note that in each trace the stimulation induced shift in the oscillatory rhythm of the cell is remarkably similar. Oscillations are clearly seen after the stimulus induced reset but can be barely detected before the stimulation.

Moreover, as shown in FIG. 1D, for a given cell, the average of six individual stimulus-evoked oscillations had the same frequency as that of the spontaneous oscillations. When the cell was stimulated by a train of stimuli, the results were similar to those shown for a single stimulus, but the reset time was prolonged (data not shown). Thus, the stimulus-evoked IO oscillations averaged over several trials had the same frequency and amplitude as spontaneous oscillations and differed only in a phase shift. In FIG. 1D, the average of six traces of stimulus evoked oscillations (solid trace) and the recording of spontaneous oscillations (dashed trace) are superimposed. The stimulus-evoked oscillations in the average trace have the same frequency and amplitude as the spontaneous oscillations and differ only in the phase shift.

The phase reset effect in IO neurons has two basic features: (i) the resulting phase after stimulation is independent of the initial phase and can be controlled by the characteristics of the stimulus; and (ii) being stimulated by the same stimulus, different cells oscillating at different phases are reset to the same phase, i.e. synchronized. The key electrical properties of IO neurons are described in Kazantsev, V. B., Nekorkin V. I., Makarenko, V. I. & Llinás, R. (2003) *Procs. Natl. Acad. Sci. USA* 100 (32), 13064-13068; Velarde, M. G., Nekorkin, V. I., Kazantsev, V. B., Makarenko, V. I. & Llinás, R. (2002) *Neural Networks* 15, 5-10.

SUMMARY OF THE INVENTION

Self-referential phase resetting (SPR) is possible using a biologically-based model in accordance with a first aspect of the present invention. The present invention provides a model based on inferior olive physiology which is capable of self-referential phase reset.

In a further aspect of the present invention, SPR mechanisms are described as are applications of the phase control strategy for artificial automatic control systems using SPR.

In yet a further aspect of the present invention, an electrical circuit that mimics the oscillatory and self-referential phase resetting properties of an inferior olive neuron is described, as is a control system comprising one or more of such circuits.

DETAILED DESCRIPTION

The present invention provides a model of individual IO neurons which reproduces their key electrical properties including self-referential phase resetting (SPR). By adding extracellular stimuli, the model of the present invention can be used to analyze the SPR effect. In a further aspect of the present invention, the model is used to recreate the SPR effect for use in control systems, as described further below.

An exemplary embodiment of the model of the present invention comprises two coupled functional blocks. Oscillations emerge from supercritical Andronov-Hopf bifurcation in the first block which drive the dynamics of the second excitable block. When reaching the threshold at the peak of a subthreshold oscillation, the model generates a spike. The timing of the spiking is thus determined by the sub-threshold oscillations. Depending on the values of the control parameters, the model qualitatively reproduces the spontaneous and stimuli-induced oscillations that have been observed in IO neurons.

An exemplary embodiment of a model in accordance with the present invention which exhibits the electrical behavior of IO neurons can be described by a set of four nonlinear differential equations as follows:

$$\varepsilon_{Na}\frac{du}{d(kt)} = f(u) - v; \quad [1]$$

$$\frac{dv}{d(kt)} = u - (z - I_{Ca}) - I_{Na};$$

$$\frac{dz}{dt} = f(z) - w;$$

$$\frac{dw}{dt} = \varepsilon_{Ca}(z - I_{Ca} - I_{ext}(t)).$$

The variables z and w are responsible for the subthreshold oscillations and low-threshold ($Ca^{2+}$-dependent) spiking, whereas the variables u and v describe the higher-threshold ($Na^+$-dependent) spiking.

The parameters $\epsilon_{Ca}$ and $\epsilon_{Na}$ control the oscillation time scales.

The parameters $I_{Ca}$ and $I_{Na}$ drive the depolarization level of the two functional blocks.

$f(x)$ is a cubic shape nonlinear function of the form $f(x)=x(x-a)(1-x)$. The parameter a controls the shape of the nonlinear function $f(x)$, particularly the excitation threshold, as well as the shape of the oscillator output during application of the excitation pulse.

The parameter k sets a relative time scale between the (u, v) and (z, w) blocks.

The function $I_{ext}(t)$ describes the extracellural stimulus. It has a nonzero value, $I_{ext}(t)=I_{st}$ only at the time of the application of the stimulus. i.e., $t_i<t<t_i+\tau_{st}$. $I_{st}$ and $\tau_{st}$ are constants describing the magnitude and duration, respectively, of the stimulus pulse arriving at the time instants $t_i$. Particular examples hereinafter set $\tau$ to 0.4T but more generally $\tau$ is approximately 0.4T where T is a period for the sub-threshold oscillations or the control oscillation and the base oscillation.

Figure 1:
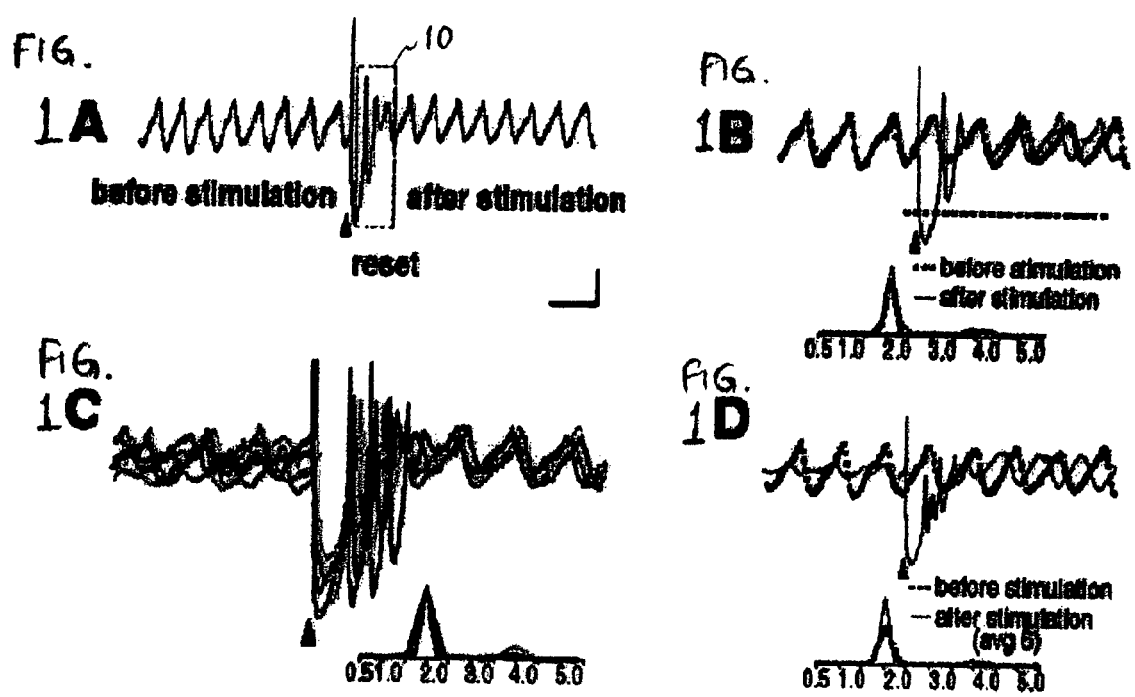
FIGS. 1A through 1D show intracellular recordings of spontaneous IO neuron oscillations.
Figure 2A:
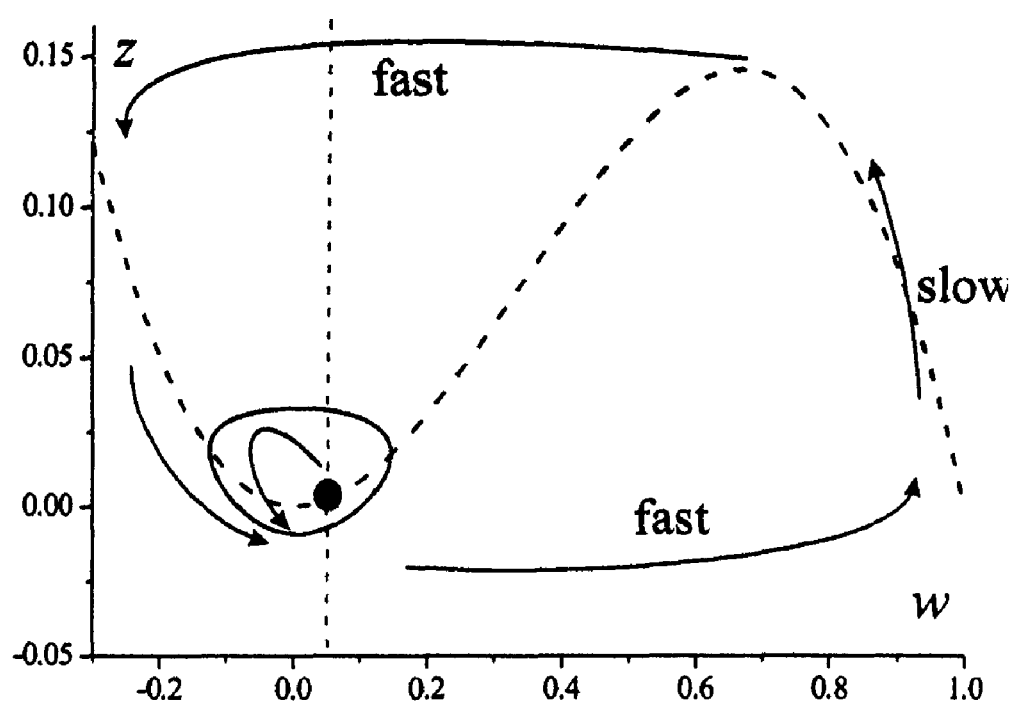
FIG. 2A shows the phase space behavior of an exemplary embodiment of a model in accordance with the present invention.
Figure 2:
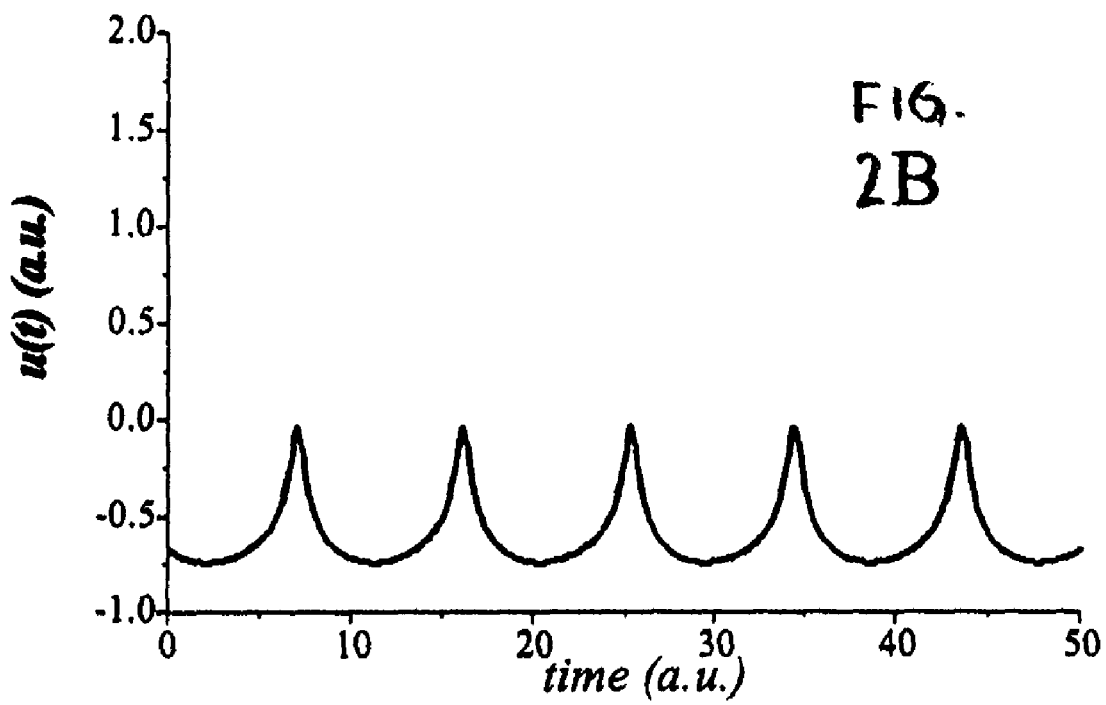
FIGS. 2B and 2C show oscillations and spiking of the model under different conditions.
Figure 2:
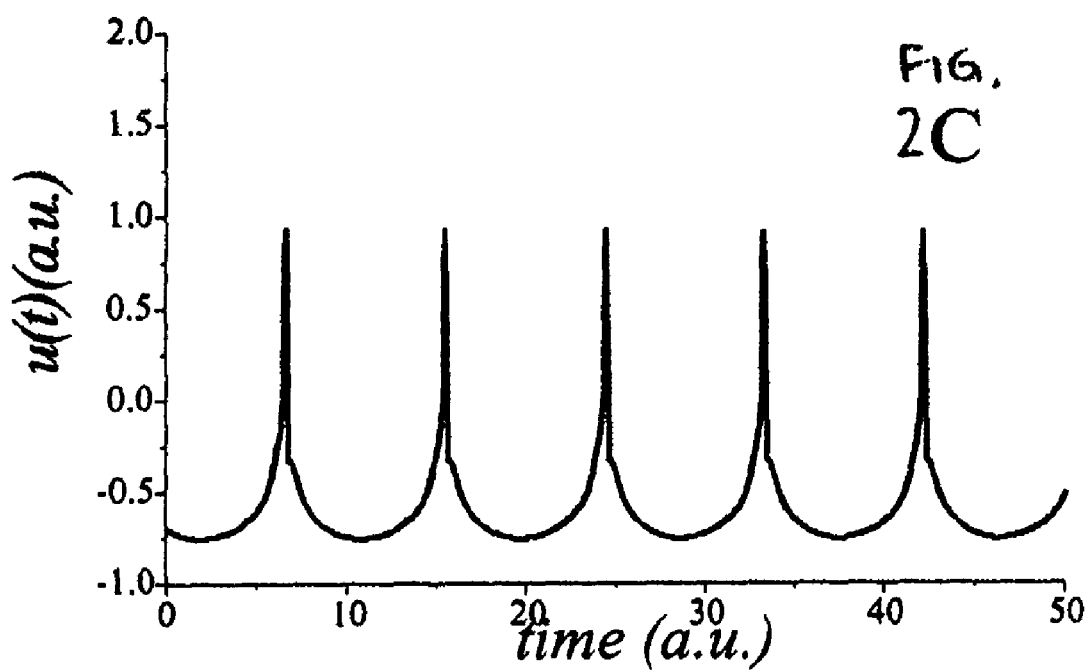

The oscillations appear in the (z, w) subsystem with a frequency and amplitude that are controlled by the depolarization parameter $I_{Ca}$. The corresponding limit cycle in the (z, w) phase space is shown in FIG. 2A. The nullclines are shown by the dashed curves. The arrows illustrate fast and slow motions. A stable limit cycle corresponding to the subthreshold oscillations appears from Andronov-Hopf bifurcation that happens when the fixed point loses its stability at the minimum of the u-nullcline curve.

The subthreshold oscillations are close to sinusoidal in shape having sharper peaks on the z-variable. These peaks provide sharper pedestals for the Na+ pulses when reaching the threshold in the (u, v) subsystem, as shown in FIGS. 2B and 2C. Due to these pedestals ($Ca^{2+}$-dependent spikes) IO spiking has a precise timing. FIG. 2B shows subthreshold oscillations with $Ca^{2+}$-dependent spiking. In this case, the (u, v) subsystem is unexcited. The following exemplary parameter values were used: $\epsilon_{Na}=0.001$; $\epsilon_{Ca}=0.02$; k=0.1; $I_{Ca}=0.018$; $I_{Na}=-0.61$; a=0.01.

FIG. 2C shows $Na^+$-dependent spiking at the peaks of the subthreshold oscillation. The following exemplary parameter values were used: $\epsilon_{Na}=0.001$; $\epsilon_{Ca}=0.02$; k=0.1; $I_{Ca}=0.018$; $I_{Na}=-0.59$; a=0.01.

The timing of the spikes can be associated with subthreshold oscillation phase. Let us define the phase, $\phi$, as the phase shift relative to a reference oscillator, R:$^{(z, w)}$, whose dynamics are described by Equation Set 1, with $I_{ext}(t)=0$. This phase shift can be determined from the oscillation peak times:

$$\varphi = 2\pi \frac{t - t_r}{T}, \quad [2]$$

where t and $t_r$ are the peak times of the subthreshold oscillations and the reference oscillations, respectively. Note that the phase, $\phi$, is a free parameter and can be set to an arbitrary value from 0 to $2\pi$ (corresponding to a zero Lyapunov exponent of the limit cycle).

Stimulus-Induced Phase Reset

In an exemplary embodiment, the following parameter values were used in the above-described model to study phase reset effects:

$\epsilon_{Na}=0.001$; $\epsilon_{Ca}=0.02$; k=0.1; $I_{Ca}=0.01$; $I_{Na}=-0.11$; a=0.01.

Figure 3:
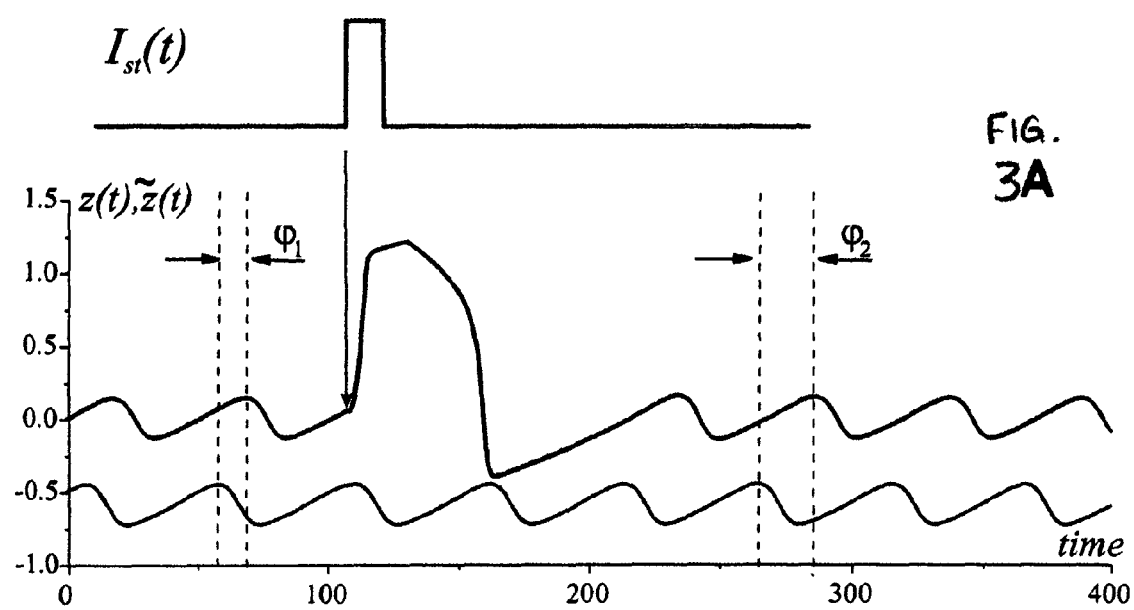
FIG. 3A illustrates phase resetting in an exemplary oscillatory unit in accordance with the present invention.
FIGS. 3B and 3C illustrate phase resetting in multiple oscillatory units provided with the same excitatory and inhibitory stimulus, respectively.
Figure 3:
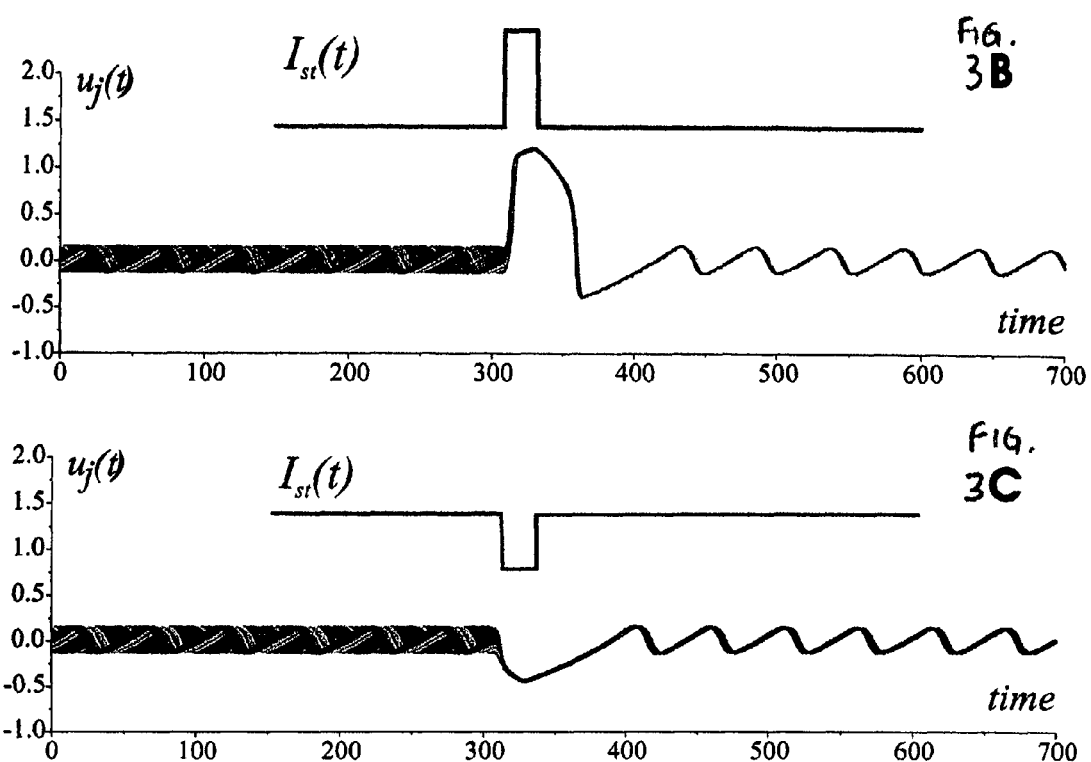

FIG. 3A illustrates the reset properties of the exemplary model when an extracellular stimulus with $I_{st}>0$ and $\tau_{st}=0.4$ T is applied. The lower oscillation trace corresponds to the base oscillator, which is unperturbed. The upper signal corresponds to the stimulus. The stimulus is applied in-phase with the reference oscillator, i.e. it is applied as the reference oscillator output ž peaks. The initial phase shift of the oscillation of the model relative to the reference oscillation is indicated as $\phi_1$. After a short transient process, the oscillation recovers its shape and frequency and has a resulting phase $\phi_2$ relative to the reference oscillation.

FIG. 3B shows the superimposed oscillations of 20 oscillators with different initial phases uniformly distributed over the range [0, $2\pi$]. The 20 oscillators operate in accordance with the above-described model. After being reset by a stimulus pulse, the phases of the oscillators are localized in a narrow range with a mean phase $\phi^*$. As FIG. 3B illustrates, the reset properties of the oscillators are independent on the initial state of the oscillator. In FIG. 3B, the following parameter values were used: $I_{st}=1.15$, $\tau_{st}=0.4$ T, T≈51.1.

FIG. 3C shows similar behavior in the case of an inhibitory stimulus. In FIG. 3C, the following parameter values were used: $I_{st}=-1$, $\tau_{st}=0.4$ T, T≈51.1.

Figure 4A:
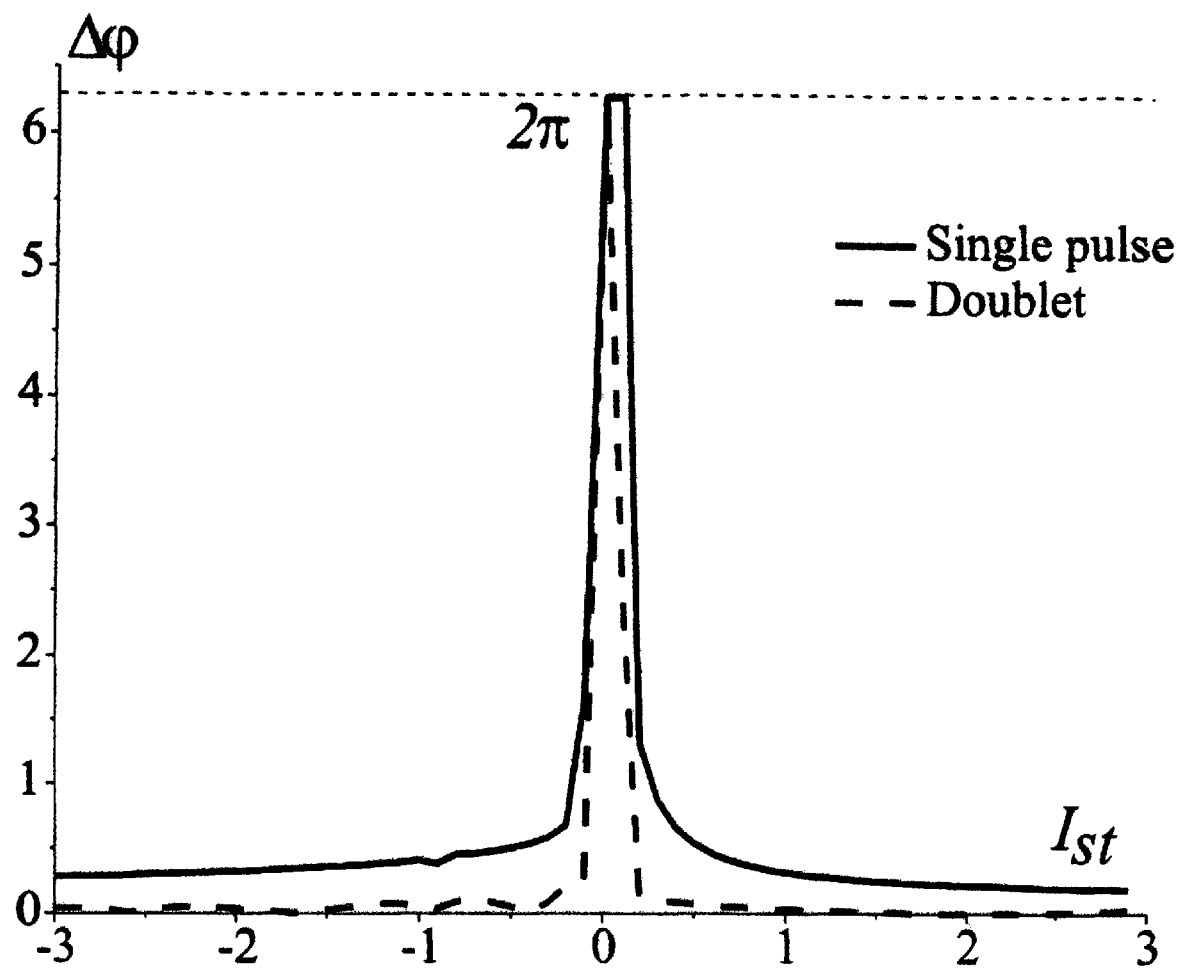
FIG. 4A shows the deviation of the reset phase with respect to the amplitude of the resetting stimulus.

FIG. 4A illustrates the dependence of reset phase deviation $\Delta\phi$ (the difference between maximum and minimum values of the reset phases) on the stimulus amplitude $I_{st}$ for a fixed stimulus pulse duration of $\tau_{st}=0.4$T. The values shown in FIG. 4A are based on 100 initial phase values uniformly distributed over the interval [0, $2\pi$]. As shown, the reset phase deviation decreases as the amplitude of the stimulus increases. Similar behavior has deviation-stimulus duration dependence (not shown here) vanishing for longer $\tau_{st}$. Note that the deviation can be decreased if one or more additional pulses are applied. FIG. 4A (dashed curve) shows the deviation in the case of stimulation with doublet pulses of duration 0.4T and having an inter-pulse interval of 12T.

Note from FIG. 4A that for small stimulus amplitudes, the reset phases are distributed over the entire range [0, $2\pi$] and the SPR effect disappears.

In accordance with the SPR effect, the reset phase is controlled only by the characteristics of the stimulus, in which case the phase response curve representing the dependence of the reset phase on the initial phase is basically a constant line at the mean reset phase $\phi^*$.

Figure 4B:
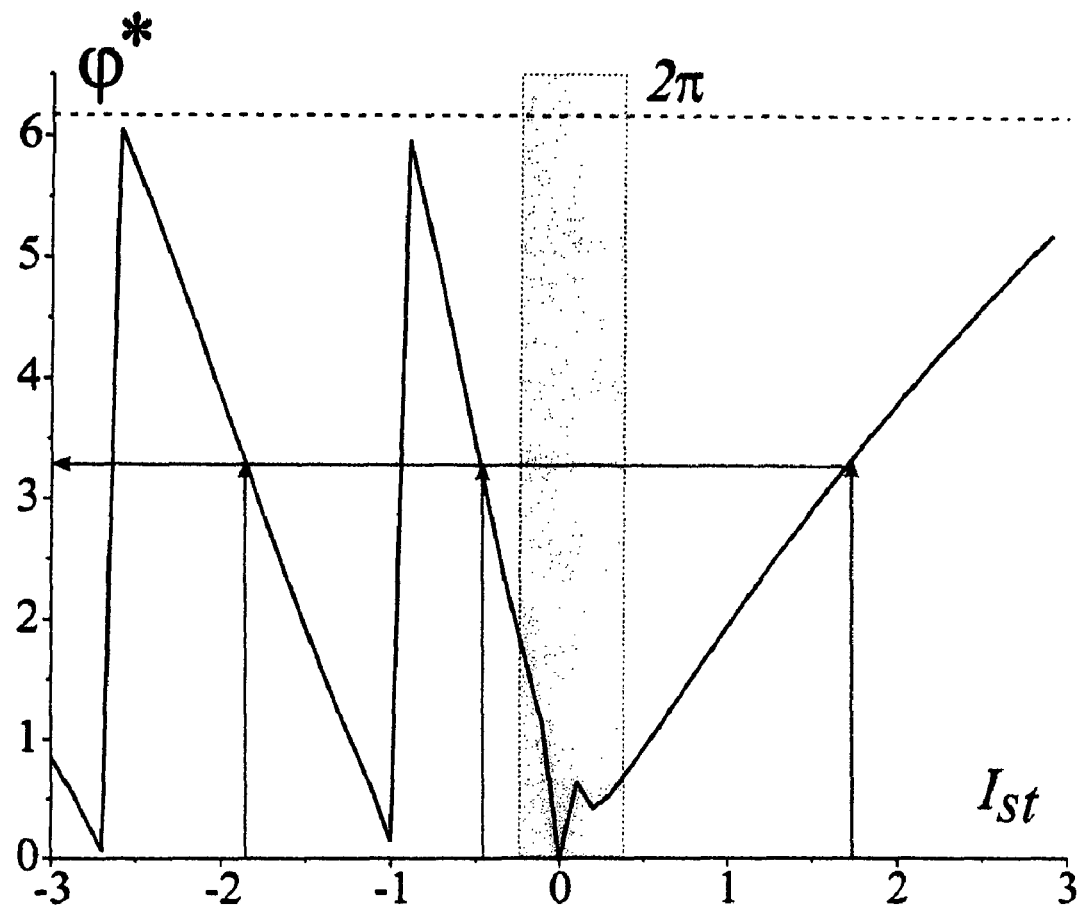
FIG. 4B shows how the reset phase varies with the amplitude of the resetting stimulus.

FIG. 4B shows how the value of the mean reset phase $\phi^*$ changes with increasing stimulus amplitude. In FIG. 4B, the stimulus duration used was $\tau_{st}=0.4$T, with T=51.1. The mean reset phase $\phi^*$ is computed as the mathematical average from N=100 oscillation traces. The green arrows show how the desired value of the reset phase can be obtained by the appropriate choice of stimulus amplitude for excitatory, $I_{st}>0$, as well as inhibitory, $I_{st}<0$, stimulation. Note that the curve of FIG. 4B covers the entire range [0, 2 $\pi$]. FIG. 4B shows that there is a point-by-point correspondence between the stimulus amplitude and the reset phase and that any desired value of the oscillation phase can be set by appropriate choice of the stimulus amplitude. Consequently, at any moment of time, one can control the oscillation phase independently of the "history" of the system evolution. Note that the SPR effect also takes place for $I_{st}<0$, i.e. for inhibitory extracellular stimuli. This is also shown in FIGS. 3C and 4A.

SPR Mechanism

Figure 5A:
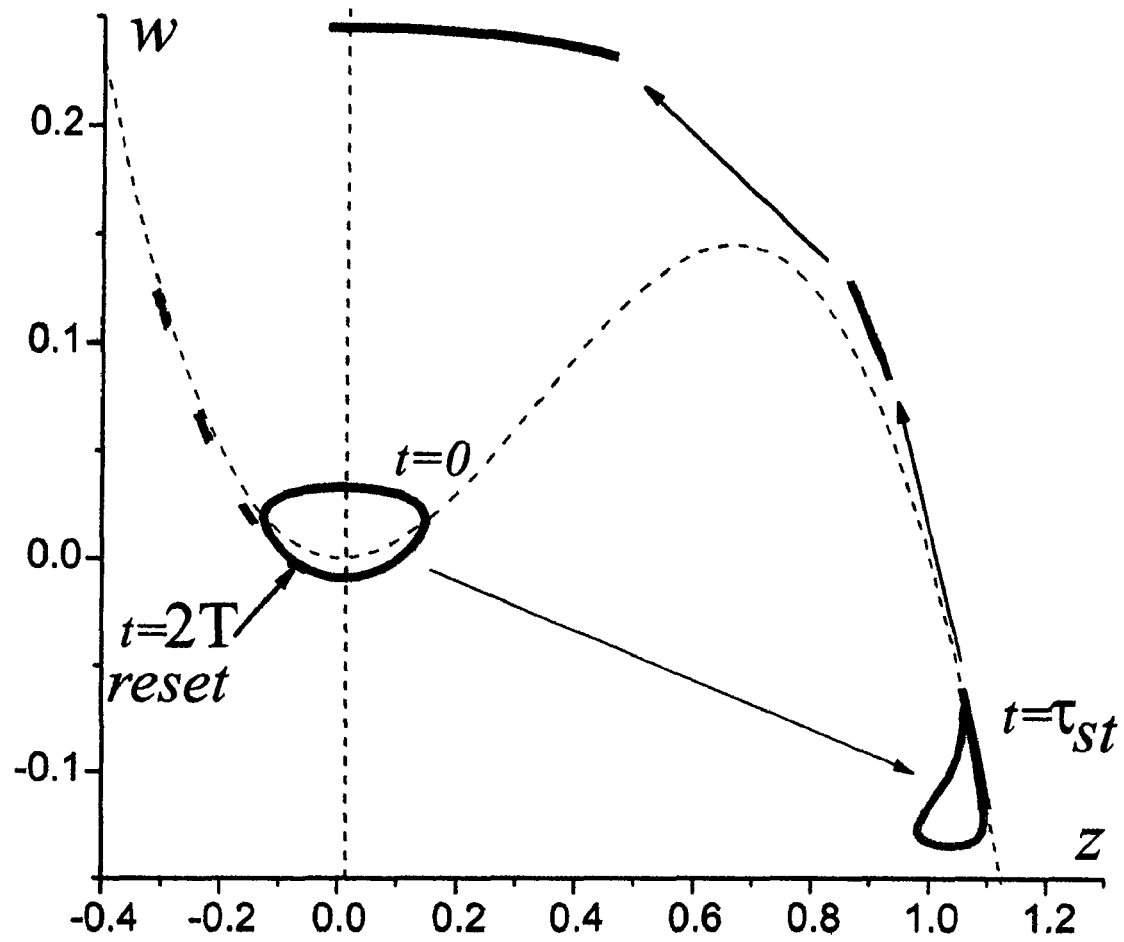
FIGS. 5A and 5B illustrate the phase space behavior of an exemplary oscillator in accordance with the present invention under excitatory and inhibitory stimulation, respectively.

FIG. 5A illustrates how multiple points (e.g., 100) uniformly distributed along the limit cycle are transformed under an excitatory stimulus. The phase volume occupied by the limit cycle becomes strongly compressed, converging to the reset point after the stimulation. A similar compression takes place for inhibitory stimuli. FIG. 5A shows a sequence of snapshots of the transformation of the initial limit cycle under an excitatory stimulus. The initial circle is compressed while evolving along the right and left compartment of the slow motion manifold located near the z-nullcline (dashed curve). The slow motion manifold refers to an isolated curve on the phase plane which is invariant relative to the system trajectories. Trajectories originating from initial conditions on this curve will belong to this curve and do not leave it as time proceeds. In the limit case where $\epsilon_{Ca}=0$, the slow motion manifold is defined by the curve w=f(z).

After the excursion, the trajectories return to the limit cycle almost in-phase. Parameter values $I_{st}=1.15$, $\tau_{st}=0.4$ T, T≈51.1 were used for FIG. 5A.

Figure 5B:
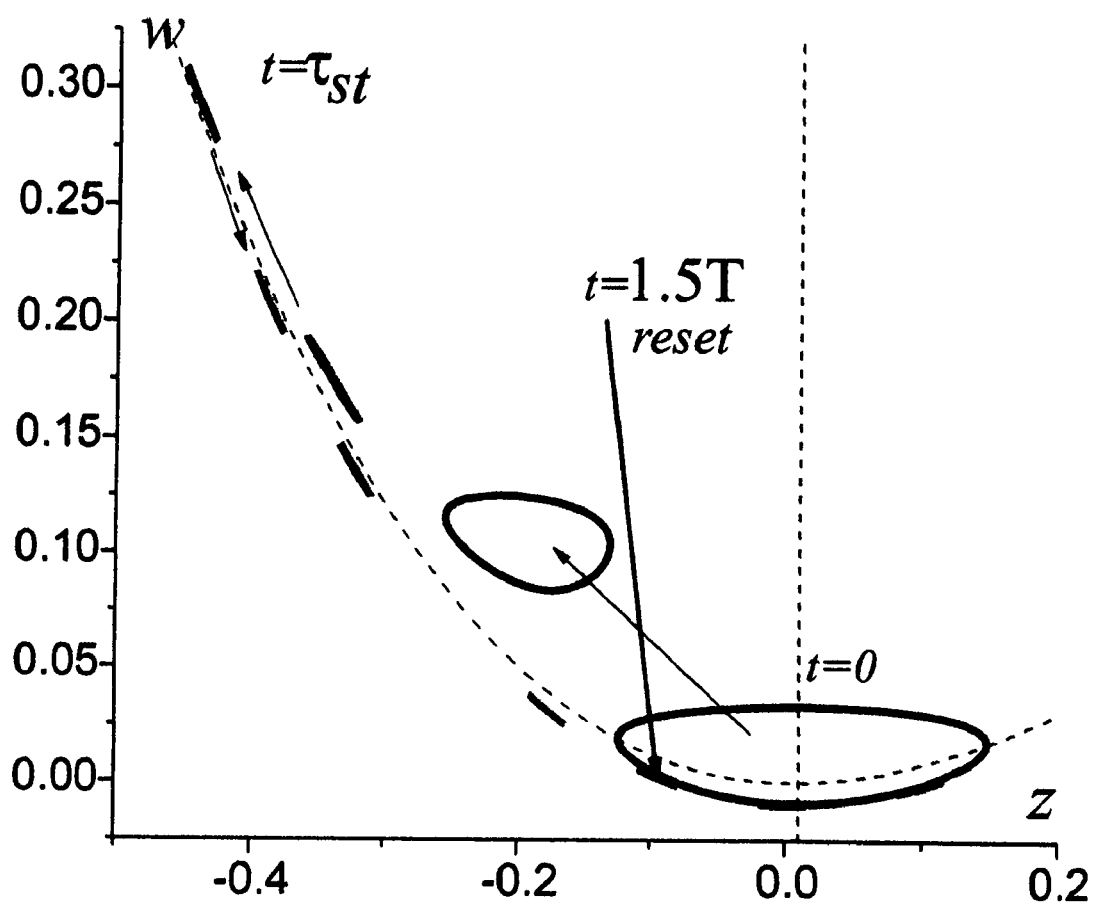

FIG. 5B illustrates the phase volume transformation for an inhibitory stimulus. In this case, the reset occurs faster (the excursion of the points is shorter) but with less precision. In this case the circle is compressed only near the left compartment of the slow motions manifold.

There are two basic mechanisms leading to SPR. The first mechanism involves relatively short stimulation pulses (less than an oscillation period). Due to the small value of the parameter $\epsilon_{Ca}(<<1)$ its trajectories have fast and slow time scales. The trajectories slow down in the neighborhood of the nonlinear curve w=f(z) and speed up further away. The limit cycle is located within this neighborhood and hence the oscillation has a relatively slow time scale. When a sufficiently strong stimulus is applied, the w-nullcline is shifted either to the right part of the nonlinear curve (excitatory stimulus) or to the left part (inhibitory stimulus). Then, while a stimulus is applied, the middle part becomes unstable and the trajectories leave it to the region of fast motion. Note that due to different time scales, the initial circle becomes strongly compressed. This compression can be treated with Lyapunov exponents indicating exponential changing of a phase volume along trajectories. The slow motions manifold located near the nonlinear curve w=f(z) has a large transverse Lyapunov exponent, λ, corresponding to the manifold stability relative to the fast motions. The value of λ can be estimated using Equation Set 1 to be:

$$\lambda \sim f'(z_0)/\epsilon \quad [3]$$

where $z_0$ is the coordinate of the points at the manifold. For the outer parts of the nonlinear curve $f'(z_0)<0$, the Lyapunov exponent is strongly negative for small $\epsilon$. This corresponds to the strong phase volume compression in the transverse direction when the trajectories evolve near the manifold. The volume becomes elongated near the manifolds. For excitatory stimuli, the trajectories jump once more into the fast motion region elongating in the horizontal direction. The phase volume again compresses near the left stable compartment of the manifold (FIG. 5A). Such a double compression provides better reset precision as compared to the inhibitory case (FIG. 5B). When the stimulus ends, all points return to the limit cycle almost in-phase.

The second reset mechanism involves longer stimulus pulses. If the stimulation is much longer than the period of oscillation, $\tau_{st}>>T$, the reset mechanism involves system relaxation to a stable fixed point. Referring to FIG. 2A, let $I_{st}>z_{max}-I_{Ca}$, where $z_{max}$ is the coordinate of the maximum of f(z). When the system is under stimulation, the (z, w) subsystem of Equation Set 1 has a stable fixed point located on the right part of the nonlinear curve f(z) attracting all trajectories. If the stimulation is long enough, all points from the limit cycle (i.e., the different initial phases) asymptotically tend to this fixed point, i.e. the phase volume (the limit cycle circle) is compressed to this point. When the system is released, the oscillation recovers with the same phase.

In the case of inhibitory pulses, the condition of the reset is $I_{st}<z_{min}-I_{Ca}$ that provides the stability of the fixed point during the stimulation. In this case, phase volume compression is provided by the Lyapunov eigenvalues of the stable fixed point that appears due to the stimulus.

SPR-Induced Synchronization

Applying the SPR effect to large ensembles of oscillatory units can provide their phase synchronization. If a large number of isolated IO units are stimulated by the same pulse, they will return the same phase and hence become mutually synchronized. (See FIGS. 3B and 3C). In contrast to classical examples of networks of inter-coupled units (e.g., ensembles of electrically coupled oscillators; see, Pikovsky, A., Rosenblum, M. & Kurths, J. (2001) *Synchronization. A Universal Concept in Nonlinear Sciences* Cambridge University Press), SPR-induced synchronization does not require coupling among the oscillators. Even remotely located cells therefore can be phase synchronized by just one or a few stimulation pulses. Moreover, given an appropriate choice of stimulus parameters (i.e., amplitude and duration) the oscillators in the network can be reset to oscillate at any relative phase, as shown in FIG. 4B. Thus one or more oscillators receiving a first stimulus can be reset to oscillate with any desired phase relative to one or more other oscillators. Different groups or clusters of oscillators (each group including at least one oscillator) can be stimulated with pulses of different amplitude and/or duration to yield different relative phases among the groups. As such, phase clusters of any complex spatial configuration can be formed. By changing the stimulus parameters, the cluster configuration can be easily rearranged irrespective of the cluster configuration that may have existed before the stimulus. This property is realized in the olivo-cerebellar network for implementing motor intention patterns. To temporarily isolate the IO neurons, the network is supplied with an inhibitory feedback that breaks the inter-neuron coupling. While staying isolated, the neurons get the direct input as a sensory feedback providing the desired cluster configuration.

Universal control systems based on the principles of olivo-cerebellar clustering have been described in Kazantsev, V. B., Nekorkin V. I., Makarenko, V. I. & Llinás, R. (2003) *Procs. Natl. Acad. Sci. USA* 100 (32), 13064-13068, and in U.S. patent application Ser. No. 10/627,355, entitled NEURO-MIMETIC CONTROL SYSTEM AND METHODS and incorporated herein by reference in its entirety.

Figure 6A:
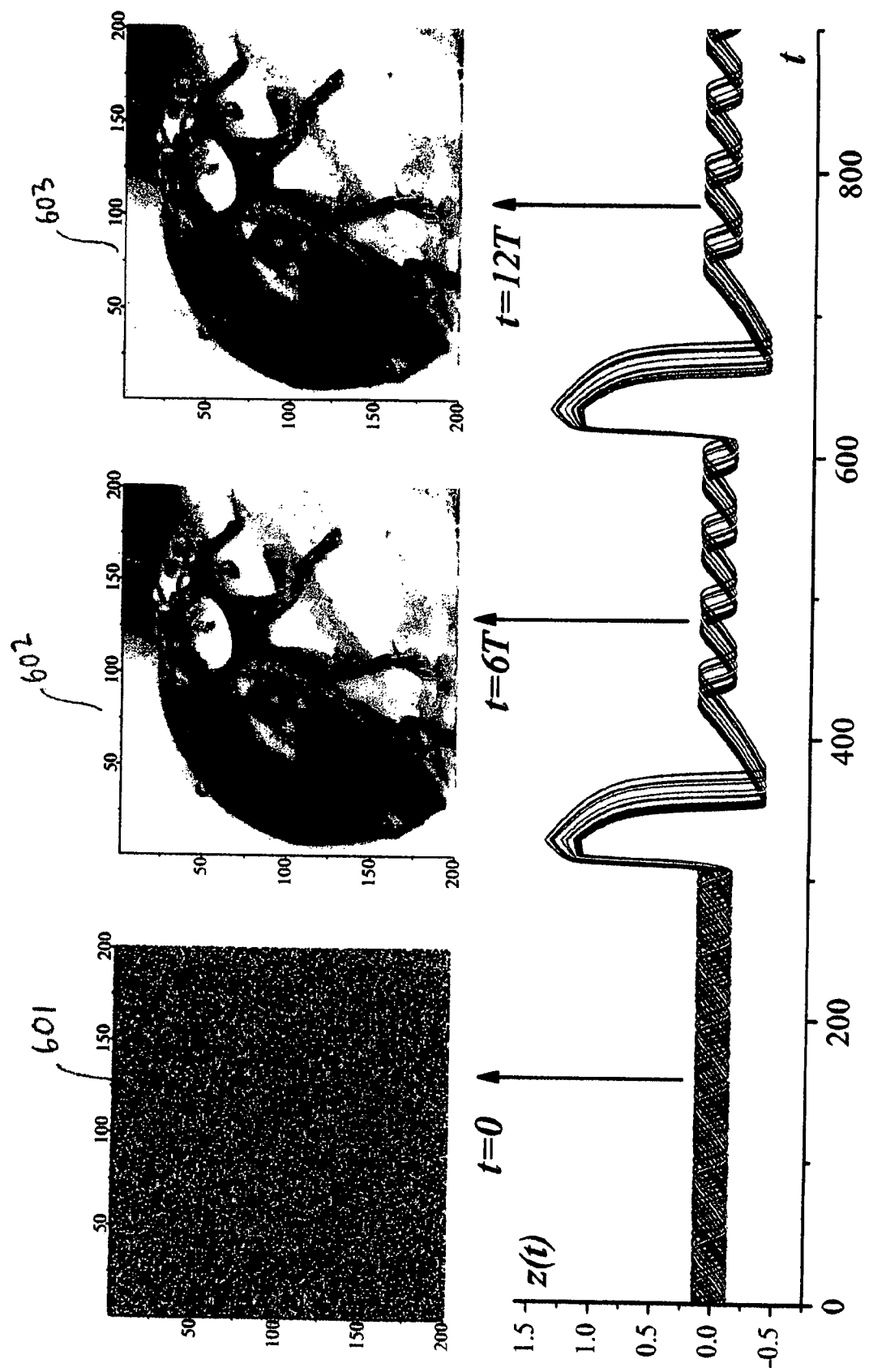
FIGS. 6A and 6B illustrate the formation of stimulus-induced patterns in a network of IO oscillatory units for excitatory and inhibitory stimuli, respectively.
Figure 6B:
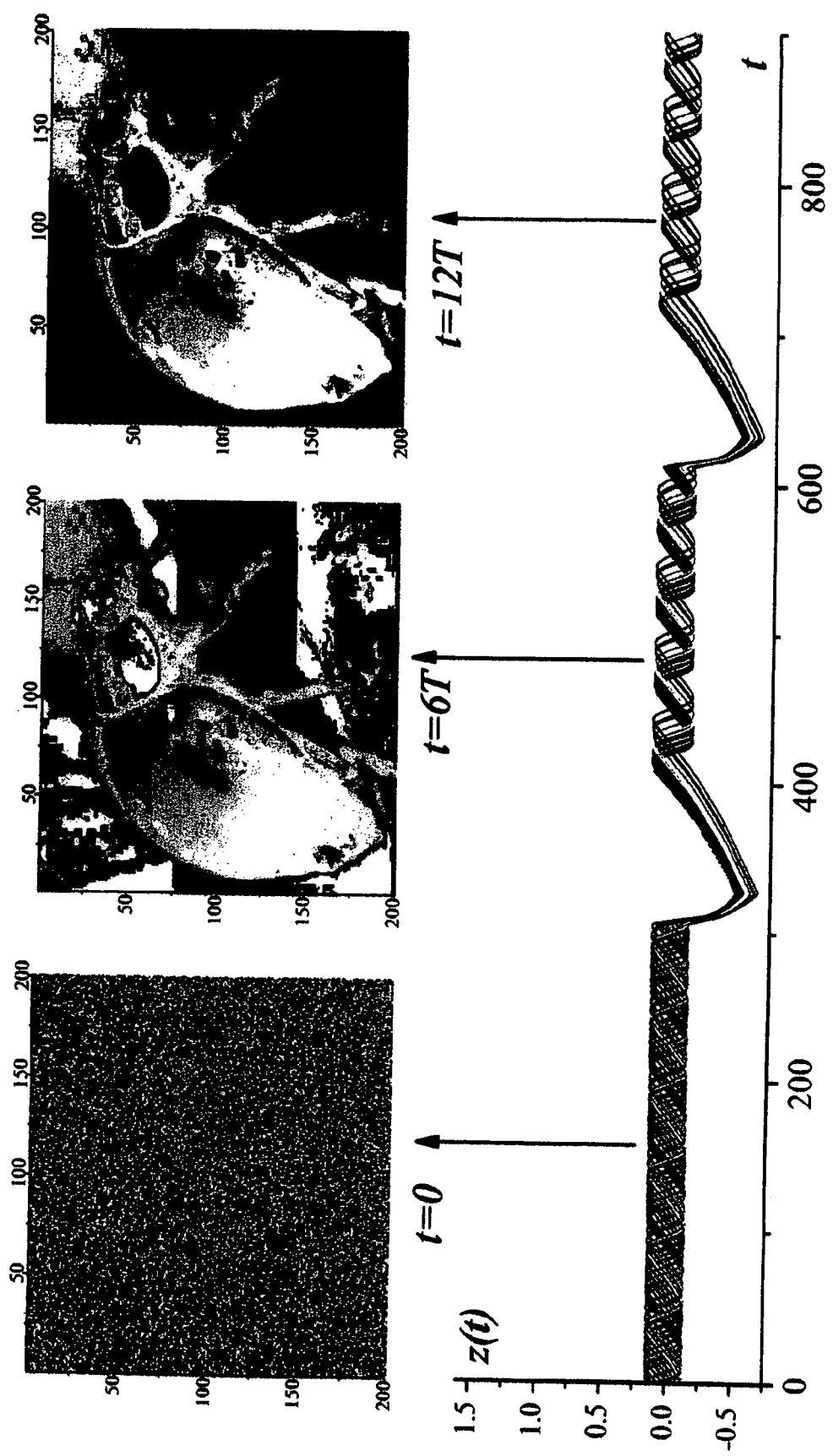

SPR-induced synchronization as implemented with an exemplary embodiment of a universal control system in accordance with the present invention is illustrated in FIGS. 6A and 6B. A square network of 200×200 locally coupled IO oscillators each implemented in accordance with the above-described exemplary model, is stimulated by a given input pattern. The input pattern is comprised of a 200×200 matrix of pulses, each of which is applied to a corresponding IO oscillator and each having a fixed duration of $\tau_{st}=0.4$T. The pulse amplitudes vary over a range $I_{st}\epsilon[I_{st}^1, I_{st}^2]$.

During the stimulation the units are uncoupled. The initial phases are randomly distributed over the range $[0, 2\pi]$.

The stimulus amplitude pattern is taken from a digitized grayscale 200×200 image, where $I_{st}[i,j]=Ist^1+(Ist^2-Ist^1)c[i,j]$, where $c[i,j]\epsilon[0,1]$ is a matrix of floating point numbers corresponding to the grayscale levels. The image, c[i,j], contains a picture of a bug.

Upon stimulation, each unit will be reset to a certain phase, as determined in accordance with the relationship shown in FIG. 4B. In the illustration of FIGS. 6A and 6B, the stimulus pattern is the grayscale image of a bug digitized and mapped into the range of amplitudes [$Ist^1$, $Ist^2$]. Starting from an initially random oscillatory phase distribution 601, the network evolves to a phase distribution 602 corresponding to the bug image.

A second stimulus pattern of the same image is applied and the system reproduces the desired phase distribution 603 corresponding to the bug image.

FIG. 6A shows the phase cluster formation for an excitatory stimulus pattern in which $Ist^1$=0.4 and $Ist^2$=3.5. Phase distribution after the stimulation nicely reproduces the desired bug picture. Doublet stimulus is shown. Shown below the images are 25 of the oscillation traces taken from the first row; i.e., i=1, j∈[101, 125] (only 25 of the 200 traces are shown for clarity). After the stimulus, the oscillators group with the required phases.

FIG. 6B shows cluster formation for an inhibitory stimulus pattern in which $Ist^1$=−2.5 and $Ist^2$=1.05. The image appears inverted due to the negative slope of the amplitude-phase curve (see FIG. 4B). Since inhibitory resetting is less precise, some details of the picture are missed after the first stimulus. The second stimulus corrects the misprints reproducing the inverted bug picture. The images are plotted with the same grayscale grade of the phase values interval [0, 2π].

Note also, that the amplitude-phase curve of FIG. 4B is piece-wise linear. Therefore, nonlinear image distortions during the transformation are negligible. The phase distribution in the network is further translated to corresponding action potential patterns when the IO units fire $Na^+$-dependent spikes (i.e., as represented by the u, v variables in Equation Set 1 and shown in FIG. 2C) at the peak times of the oscillations. When stimulated, the units are effectively uncoupled due to the inhibitory feedback. When synchronized to the desired cluster configuration, the system tends to sustain the cluster configuration if no other stimuli are applied. In-phase oscillators have a shorter coupling inhibition, hence become effectively coupled and thereby sustaining the synchronization. Out-of-phase oscillators have a prolonged coupling inhibition because the inhibition periods are summed from the two units. They therefore stay effectively uncoupled, sustaining their phase difference. Note, that the example of the SPR effect in the UCS-based network represents, in fact, the mechanism of sensory-motor transformation in the brain. The sensorial information in the form of sequences of action potentials appropriately reset the motor control oscillators to a phase pattern that is further converted to a space-time distribution of action potentials for implementing motor execution patterns.

The SPR effect experimentally observed in IO neurons can be effectively modelled using the nonlinear dynamical model of the present invention. The SPR property of IO neurons plays a role in the global functions of the olivo-cerebellar network for providing motor control. Because the response of the system is independent of initial phase, the system is extraordinarily flexible to implement a given motor intention and to modify it in real time according to sensorial information. The system does not need to continuously keep its current configuration, being able to successively reset to a given pattern from any state. In other words, the system does not need any operation memory, making it very reliable and preventing "computational overloads" that occur when memorizing the states. The SPR effect is quite fast (on the order of an oscillation period), allowing the system to operate in real time.

The SPR property of IO oscillators in accordance with the present invention allows them to be used advantageously in artificial control systems. Indeed, the IO oscillator represents a phase controller. One can set and keep a required phase by stimulating the oscillator with the appropriate pulse stimulus. If the phase is associated with a physical parameter (e.g., position, velocity, angle, temperature, etc.) the phase controller can maintain it at a desired level. In contrast with standard control systems, the controlling principle here deals with "stumbling response." See e.g., Yamasaki, T., Nomura, T & Sato, S. (2003) *BioSystems*. In other words, when stumbling in response to an obstacle, a walking animal does not fall but resets its walking rhythm, irrespective of the moment at which the obstacle has appeared.

Another interesting SPR application concerns the synchronization of oscillatory systems. Multiple oscillators can be synchronized by stimulating them with the same stimulus pulse. Such synchronization could be very powerful when the task is to synchronize a large array of oscillators or to synchronize spatially distant cells. Such arrays (like the inferior olive) do not need a complex network of interconnections among the cells. Rather, a single stimulation signal generated by a master cell can be used to stimulate multiple cells at the same instant of time.

In yet a further aspect of the present invention, the SPR effect can be used to provide a mechanism whereby information can be represented and stored in the form of oscillatory clusters. In contrast with Hopfield gradient networks the formation of oscillatory clusters can be extremely fast as one can speed up the oscillators up to the limits of the constituent materials. See Hopfield, J. J. (1982). *PBAS* 79, 2554-2558. Compared to Kuramoto-like oscillatory systems where a complex coupling matrix should be applied to form the clusters (Hebbian learning rule), the SPR-based pattern formation can work directly with digitized information converted to the stimulus template. See Abott, L. F. (1990) *J. Phys. A* 23, 3835.

Oscillator Circuit with Reset Property

Figure 7:
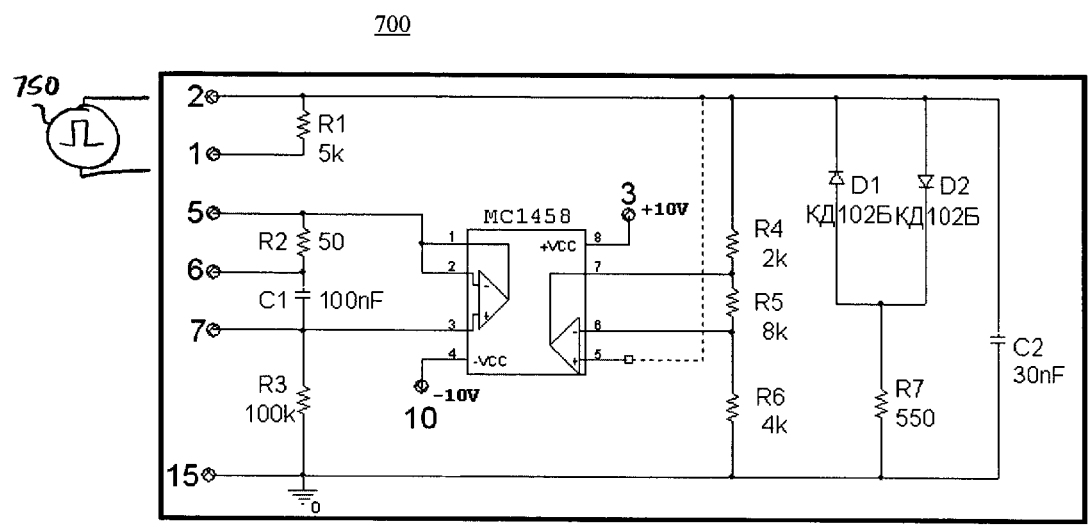
FIG. 7 is a schematic representation of an exemplary embodiment of an oscillator circuit in accordance with the present invention.

An exemplary embodiment of an oscillator circuit that mimics the above-described properties will now be described with reference to FIG. 7.

The exemplary circuit 700 shown can operate in a variety of modes. In a first mode, the circuit oscillates with a quasi-sinusoidal signal at approximately 930 Hz when power is applied at terminals 3 and 10, as shown, and terminals 2 and 6 are connected together. The oscillatory output can be monitored on terminal 2.

In a second mode, the circuit 700 can operate with impulse stimulation. In this mode, terminals 1 and 6 are connected together. A pulse generator 750 is connected across terminals 1 and 2 to provide the pulse stimulation to the circuit. The output of the circuit 700 can be monitored at terminal 2.

In an exemplary embodiment, +10 v is applied to terminal 3 and −10 v is applied to terminal 10 for power and the amplitude of the pulses generated by the pulse generator is 0.1 to 5.0 v, with a pulse duration of 1 msec.

The circuit 700 can be implemented with discrete components or in an integrated circuit. The op-amps can be implemented, for example, using an MC1458 op-amp circuit. The component values shown are exemplary and can vary depending on the application.

Controller

Figure 8:
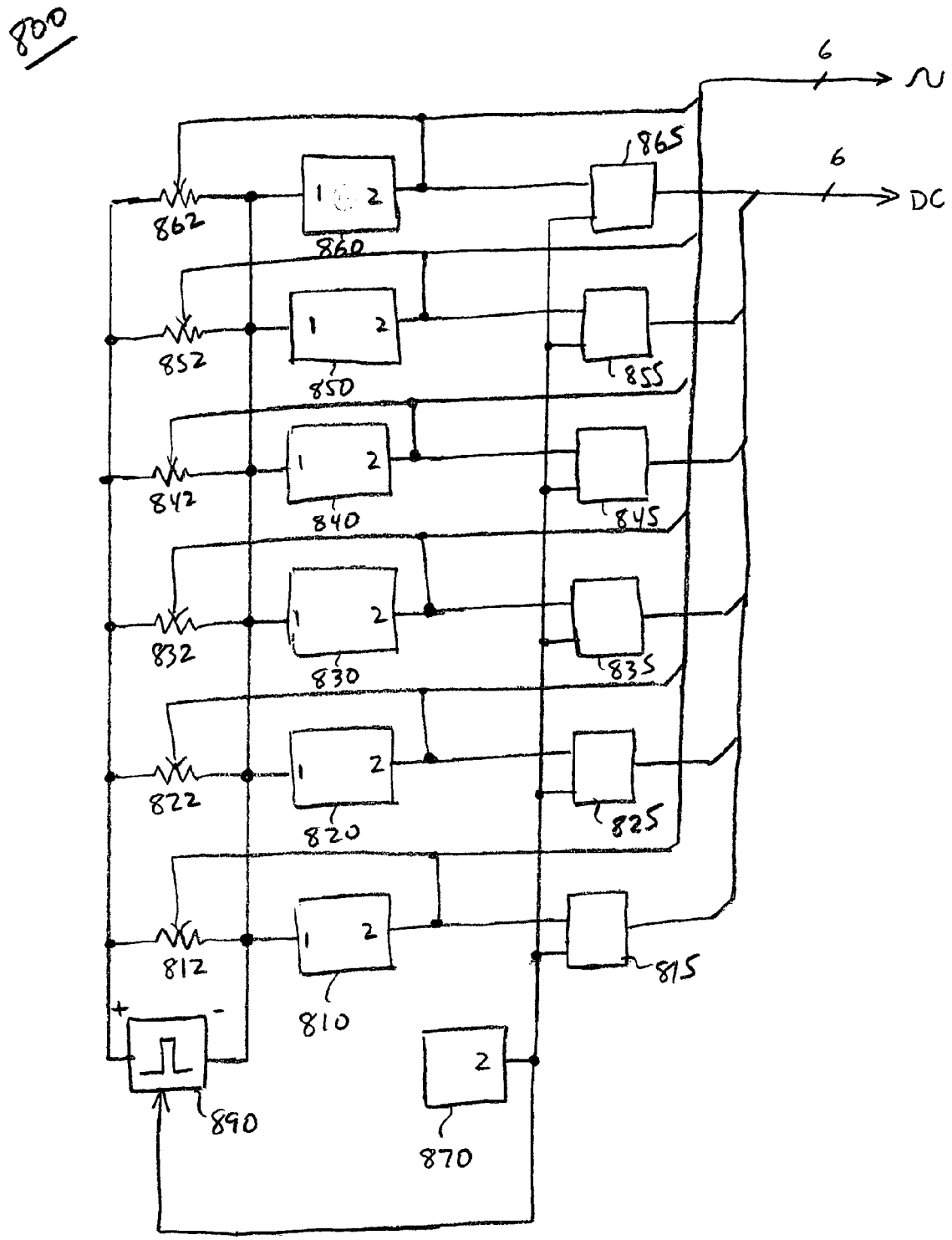
FIG. 8 is a schematic representation of an exemplary embodiment of a control system in accordance with the present invention.

FIG. 8 shows a block diagram of an exemplary controller 800 implemented with a plurality of oscillator circuits 810-870, each of which can be implemented using the exemplary circuit 700 described above. The labels "1" and "2" indicate the terminals 1 and 2 of the exemplary circuit 700.

The oscillator 870 is set up to operate as a base oscillator, oscillating at a stable frequency (e.g., 930 Hz) and phase. A pulse generator 890 generates a pulse every N cycles of oscillation of the oscillator 870. In an exemplary embodiment, N=10. As such, for an oscillation frequency of 930 Hz, pulses are generated at a frequency of 93 Hz. In an exemplary embodiment, the amplitude of each pulse is 5 volts and the duration is less than 2 msec.

The pulses generated by the pulse generator 890 are provided to each oscillator 810-860 via a pulse amplitude adjuster 812-862, respectively. Each pulse amplitude adjuster 812-862, individually adjusts the amplitude of the pulses applied to its respective oscillator 810-860. The pulse amplitude adjusters 812-862 comprise circuitry that may be capable of attenuating the pulses, amplifying the pulses, or both. In an exemplary embodiment, the pulse amplitude adjusters 812-862 comprise variable resistors arranged as variable resistor dividers to attenuate the pulses applied to their respective oscillators.

The output of each oscillator 810-860 is provided to a respective phase detector 815-865. The output of the base oscillator 890 is provided to all of the phase detectors 815-865. Each phase detector 815-865 generates a DC signal whose level is indicative of the phase difference between the corresponding oscillator 810-860 and the base oscillator 890. The signals generated by the phase detectors can be used to control electro-mechanical devices or the like.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

Patents, patent applications, and publications are cited throughout this application, the disclosures of which are incorporated herein by reference in their entireties.

What is claimed is:

1. A settable analog oscillator circuit for use in a control system, the oscillator circuit comprising:
   a first circuit for generating a sub-threshold analog oscillation signal for use in controlling an actuator;
   a setting mechanism for receiving an analog stimulus signal causing a phase of the sub-threshold oscillation signal to be set to a certain desired phase independent of a previous phase of the oscillation signal and the certain desired phase is a function of an amplitude of the stimulus signal;
   wherein the sub-threshold oscillation signal set to a certain desired phase is capable of controlling the actuator based on the certain desired phase it is set to.

2. The oscillator of claim 1, wherein the sub-threshold oscillations include an amplitude variable and are sinusoidal in shape with sharper peaks for the amplitude variable.

3. The oscillator of claim 1, wherein the sub-threshold oscillations have a period T and the stimulus comprises a pulse having a duration τ, wherein τ<T.

4. The oscillator of claim 3, wherein τ is approximately 0.4T.

5. The oscillator of claim 3, wherein one pulse is applied once every integer number of cycles greater than one.

6. The oscillator of claim 5, wherein the integer number of cycles is ten.

7. The oscillator of claim 1, wherein the certain desired phase is a function of a time duration of the stimulus.

8. A control system, comprising:
   a plurality of settable oscillator circuits, each settable oscillator circuit comprising:
      a first circuit for generating a sub-threshold analog oscillation signal for use in controlling an actuator;
      a setting mechanism for receiving an analog stimulus signal causing a phase of the sub-threshold oscillation signal to be set to a certain desired phase independent of a previous phase of the oscillation signal and the certain desired phase is a function of an amplitude of the stimulus signal;
   wherein the sub-threshold oscillation signal set to a certain desired phase is capable of controlling the actuator based on the certain desired phase it is set to.

9. The control system of claim 8, wherein the certain desired phase is a function of an amplitude of the stimulus.

10. A controller for controlling an actuator comprising:
    a control oscillator;
    a base analog oscillator;
    a pulse generator, the pulse generator generating an analog pulse for every integer number of cycles of oscillation greater than one of the base oscillator, the pulse being applied to an input of the control oscillator; and
    a phase detector for generating a signal based on a phase difference between the control oscillator and the base oscillator for setting a phase of the control oscillator to a certain desired phase in accordance with the applied pulse and independent of a previous phase of the control oscillator and the certain desired phase is a function of an amplitude of the stimulus signal, to thereby control the actuator.

11. The controller of claim 10, wherein the signal generated by the phase detector is used to control an electromechanical device.

12. The controller of claim 10, wherein the base oscillator oscillates with a stable frequency and phase.

13. The controller of claim 10, wherein the integer number of cycles is equal to ten.

14. The controller of claim 10, comprising a pulse amplitude adjuster for varying an amplitude of the pulses generated by the pulse generator and applied to the input of the control oscillator.

15. The controller of claim 14, wherein the pulse amplitude adjuster comprises a variable resistor divider.

16. The controller of claim 10, comprising two or more control oscillators, each control oscillator being coupled to a corresponding pulse amplitude adjuster and a phase detector.

17. The controller of claim 10, wherein the control oscillator and the base oscillator oscillate with a period T and the pulse has a duration τ, wherein τ<T.

18. The controller of claim 17, wherein τ is substantially equal to 0.4T.

19. A control method for controlling an actuator comprising:
    generating a control oscillation;
    generating a base oscillation;
    generating a stimulus pulse for every integer number of cycles greater than one of the base oscillation;
    setting a phase of the control oscillation to a certain desired phase in accordance with the stimulus pulse independent of a previous phase of the control oscillator and the certain desired phase is a function of an amplitude of the stimulus signal;
    generating a control signal as a function of a difference between the phase of the control oscillation and a phase of the base oscillation for controlling the actuator; and
    controlling the actuator with the control signal, wherein the control signal is capable of controlling the actuator based on the certain desired phase which the control oscillation is set to.

20. The method of claim 19, wherein the base oscillation has a stable frequency and phase and the base oscillation stable frequency and frequency of the control oscillation are the same.

21. The method of claim 19, wherein the integer-number of cycles is equal to ten.

22. The method of claim 19, comprising adjusting an amplitude of the stimulus pulse.

23. The method of claim 19, comprising generating two or more control oscillations, a control signal being generated as a function of a difference between a phase of each control oscillation and the base oscillation.

24. The method of claim 19, wherein the control oscillation and the base oscillation have a period T and the stimulus pulse has a duration $\tau$, wherein $\tau<T$.

25. The method of claim 24, wherein $\tau$ is approximately 0.4T.

26. A method for controlling a plurality of settable oscillator circuits, comprising the following steps:
generating a sub-threshold oscillation signal by each of the plurality of settable oscillator circuits;
applying a stimulus signal to each of the plurality of settable oscillator circuits to thereby cause a phase of the oscillation signal of each of the plurality of settable oscillator circuits to be set to the same phase independent of a previous phase of the oscillator circuits and the certain desired phase is a function of an amplitude of the stimulus signal;
wherein each oscillation signal set to a certain desired phase is capable of controlling an actuator based on the certain desired phase it is set to.

27. The method of claim 26, wherein the set phase is a function of an amplitude of the stimulus.

28. The method of claim 26, wherein the set phase is a function of a time duration of the stimulus.

29. A control system, comprising:
a plurality of settable oscillator circuits, each settable oscillator circuit comprising:
a first circuit for generating a sub-threshold oscillation signal for use in controlling an actuator;
a setting mechanism for receiving a stimulus signal causing a phase of the sub-threshold oscillation signal to be set to a certain desired phase independent of a previous phase of the oscillation signal and the certain desired phase is a function of an amplitude of the stimulus signal;
wherein the plurality of oscillator circuits are uncoupled from each other and are set to the same certain desired phase such that the plurality of oscillator circuits are capable of being synchronized and are thereby capable of synchronously controlling a plurality of actuators.

30. The control system of claim 29, wherein the certain desired phase is a function of an amplitude of the stimulus.

31. The control system of claim 29, wherein the certain desired phase is a function of a time duration of the stimulus.

32. A control system, comprising:
a plurality of settable oscillator circuits, each settable oscillator circuit comprising:
a first circuit for generating a sub-threshold oscillation signal for use in controlling an actuator;
a setting mechanism for receiving a stimulus signal causing a phase of the sub-threshold oscillation signal to be set to a certain desired phase independent of a previous phase of the oscillation signal and the certain desired phase is a function of an amplitude of the stimulus signal;
wherein the plurality of oscillator circuits comprises at least a first set of oscillator circuits and a second set of oscillator circuits, the first set and the second set being uncoupled from each other, each of the oscillators of the first set of oscillator circuits being set to a first certain desired phase, each of the oscillators of the second set of oscillator circuits being set to a second certain desired phase, such that the oscillators of the first set of oscillator circuits are capable of being synchronized relative to each other, and the oscillators of the second set of oscillator circuits are capable of being synchronized relative to each other;
wherein the first set of oscillator circuits is capable of synchronously controlling a first set of actuators based on the certain desired phase the first set of oscillator circuits is set to, and the second set of oscillator circuits is capable of synchronously controlling a second set of actuators based on the certain desired phase the second set of oscillator circuits is set to.

33. The control system of claim 32, wherein the first set of oscillator circuits and the second set of oscillator circuits are capable of being synchronized relative to each other based on a relative phase of the first certain desired phase and the second certain desired phase.

34. The control system of claim 32, wherein the certain desired phase is a function of an amplitude of the stimulus.

35. The control system of claim 32, wherein the certain desired phase is a function of a time duration of the stimulus.

* * * * *